United States Patent
Wang et al.

(10) Patent No.: US 11,874,754 B1
(45) Date of Patent: Jan. 16, 2024

(54) MITIGATING TEMPERATURE INDUCED PERFORMANCE VARIATION

(71) Applicant: International Business Machines Corporation, Armonk, NY (US)

(72) Inventors: Chen Wang, Chappaqua, NY (US); Huamin Chen, Newton, MA (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 18/327,095

(22) Filed: Jun. 1, 2023

(51) Int. Cl.
  *G06F 11/30* (2006.01)
  *G06F 9/50* (2006.01)
  *G06F 1/20* (2006.01)

(52) U.S. Cl.
  CPC .......... *G06F 11/3058* (2013.01); *G06F 1/206* (2013.01); *G06F 9/5083* (2013.01)

(58) Field of Classification Search
  None
  See application file for complete search history.

(56) References Cited

U.S. PATENT DOCUMENTS

| | | | | |
|---|---|---|---|---|
| 7,036,030 B1 * | 4/2006 | Altmejd | ................. | G06F 1/324 713/322 |
| 7,330,983 B2 * | 2/2008 | Chaparro | ............. | G06F 9/5094 712/E9.071 |
| 7,347,621 B2 * | 3/2008 | Sri-Jayantha | .......... | G06F 1/206 374/111 |
| 7,421,623 B2 * | 9/2008 | Haugh | .................... | G06F 1/206 714/1 |
| 8,436,720 B2 * | 5/2013 | Archer | ...................... | G06F 9/54 709/224 |
| 8,768,666 B2 * | 7/2014 | Anderson | .............. | G06F 1/203 703/6 |
| 8,792,968 B2 * | 7/2014 | Xiao | ..................... | A61B 5/015 382/128 |

(Continued)

OTHER PUBLICATIONS

Anonymous, "Method and Apparatus for Temperature Reduction for NVMe Storage System for Retention of Premium Application Performance," IP.com, IPCOM000261802D, Apr. 5, 2020, 8 pages.

(Continued)

*Primary Examiner* — Backhean Tiv
(74) *Attorney, Agent, or Firm* — CANTOR COLBURN LLP; Monchai Chuaychoo

(57) ABSTRACT

Computer-implemented methods for mitigating temperature induced performance variation in a cloud computing system are provided. Aspects include distributing a plurality of microservices among a plurality of compute nodes in a cloud computing system and monitoring a temperature of processors executing each of the plurality of microservices on each of the plurality of compute nodes. Aspects also include calculating a distribution of the temperatures of the processors including a mean temperature and identifying a first group of computing nodes from the plurality of compute nodes having temperatures within a threshold deviation from the mean temperature. Aspects further include controlling an operation of a cooling system of each of the first group of computing nodes and redistributing one or more of the plurality of microservices disposed on a remaining group of computing nodes that are not part of the first group of computing nodes.

20 Claims, 5 Drawing Sheets

(56) References Cited

U.S. PATENT DOCUMENTS

| | | | |
|---|---|---|---|
| 8,899,060 B2* | 12/2014 | Hall | G05D 23/1919 |
| | | | 361/689 |
| 9,250,663 B2* | 2/2016 | Dawson | G06F 1/206 |
| 9,268,378 B2* | 2/2016 | Rotem | G06F 1/3206 |
| 9,638,583 B2* | 5/2017 | Ross | G06F 11/301 |
| 9,857,235 B2* | 1/2018 | Hamann | G01K 7/42 |
| 9,989,980 B1* | 6/2018 | Urban | G03B 17/55 |
| 10,677,962 B2* | 6/2020 | McKinnon | G01W 1/00 |
| 10,791,063 B1 | 9/2020 | Florissi et al. | |
| 10,845,854 B1* | 11/2020 | Winter | G06F 1/206 |
| 10,860,622 B1 | 12/2020 | Florissi | |
| 10,962,946 B2 | 3/2021 | Cebasek et al. | |
| 10,972,503 B1 | 4/2021 | Mohan et al. | |
| 11,010,233 B1 | 5/2021 | Golden et al. | |
| 2010/0082385 A1* | 4/2010 | Cao | G06Q 10/06393 |
| | | | 715/771 |
| 2022/0357786 A1* | 11/2022 | Zong | G06F 11/3058 |
| 2023/0259185 A1* | 8/2023 | Guim Bernat | G06F 1/20 |
| | | | 702/130 |

OTHER PUBLICATIONS

Anonymous, "System & Method for Adaptive, Fast, Multi-station Thermal Management," IP.com, IPCOM000211581D, Oct. 12, 2011, 4 pages.

Anonymous, "System and Method for Phase Aware Processing for Improving Microservice Application Performance," IP.com, IPCOM000271034D, Sep. 30, 2022, 9 pages.

Bach, "Impact of Temperature on Intel CPU Performance," Puget Systems, Oct. 28, 2014, 9 pages.

Homayoun et al., "Hot Peripheral Thermal Management to Mitigate Cache Temperature Variation," 13th Int'l Symposium on Quality Electronic Design, 2012, 9 pages.

Rahman et al., "Predicting the End-to-End Tail Latency of Containerized Microservices in the Cloud," 2019 IEEE International Conference on Cloud Engineering (IC2E), 2019, pp. 200-210.

Yousaf, "Container Orchestration and Performance Optimization for a Microservices-based Application," Mater Thesis, KTH Royal Institute of Technology, 2022, 75 pages.

* cited by examiner

MITIGATING TEMPERATURE INDUCED PERFORMANCE VARIATION

BACKGROUND

The present disclosure generally relates to cloud computing, and more specifically, to mitigating temperature induced performance variation in a cloud computing system.

In a cloud computing system, microservices are distributed across multiple compute nodes, which each include one or more pods, for execution. A microservice is a software architectural style where applications are built as a collection of small, loosely coupled, and independently deployable services. Each microservice is designed to perform a specific business function and can be developed, deployed, and scaled independently of other services. Microservices are typically organized around business capabilities and are built to be modular and highly decoupled. They communicate with each other through well-defined APIs, often using lightweight protocols such as HTTP or message queues. Each microservice can be developed using different programming languages, frameworks, and technologies, as long as they adhere to the defined interface.

In a cloud computing context, microservices provide scalability and flexibility, as individual services can be scaled independently based on demand. Microservices are commonly used in cloud-native applications, where they are deployed and managed within containers, such as Docker, or orchestrated using platforms like Kubernetes. By leveraging the cloud infrastructure, microservices can take advantage of features like auto-scaling, load balancing, and dynamic resource allocation to ensure efficient and resilient operation.

Microservices are often invoked in massive parallelism across multiple compute nodes, which introduces long-tailed performance variation, i.e., performance from each workload replica varies due to the different states of the compute note on which the replica resides. One of the causes of performance variation among the compute nodes is temperature variations among the processors of the compute nodes.

SUMMARY

Embodiments of the present disclosure are directed to computer-implemented methods for mitigating temperature induced performance variation in a cloud computing system. According to an aspect, a computer-implemented method includes distributing a plurality of microservices among a plurality of compute nodes in a cloud computing system and monitoring a temperature of processors executing each of the plurality of microservices on each of the plurality of compute nodes. The method also includes calculating a distribution of the temperatures of the processors including a mean temperature and identifying a first group of computing nodes from the plurality of compute nodes having temperatures within a threshold deviation from the mean temperature. The method further includes controlling an operation of a cooling system of each of the first group of computing nodes and redistributing one or more of the plurality of microservices disposed on a remaining group of computing nodes that are not part of the first group of computing nodes.

Embodiments also include computing systems and computer program products for mitigating temperature induced performance variation in a cloud computing system.

Additional technical features and benefits are realized through the techniques of the present disclosure. Embodiments and aspects of the disclosure are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the present disclosure are apparent from the following detailed description taken in conjunction with the accompanying drawings in which:

DETAILED DESCRIPTION

Figure 1:
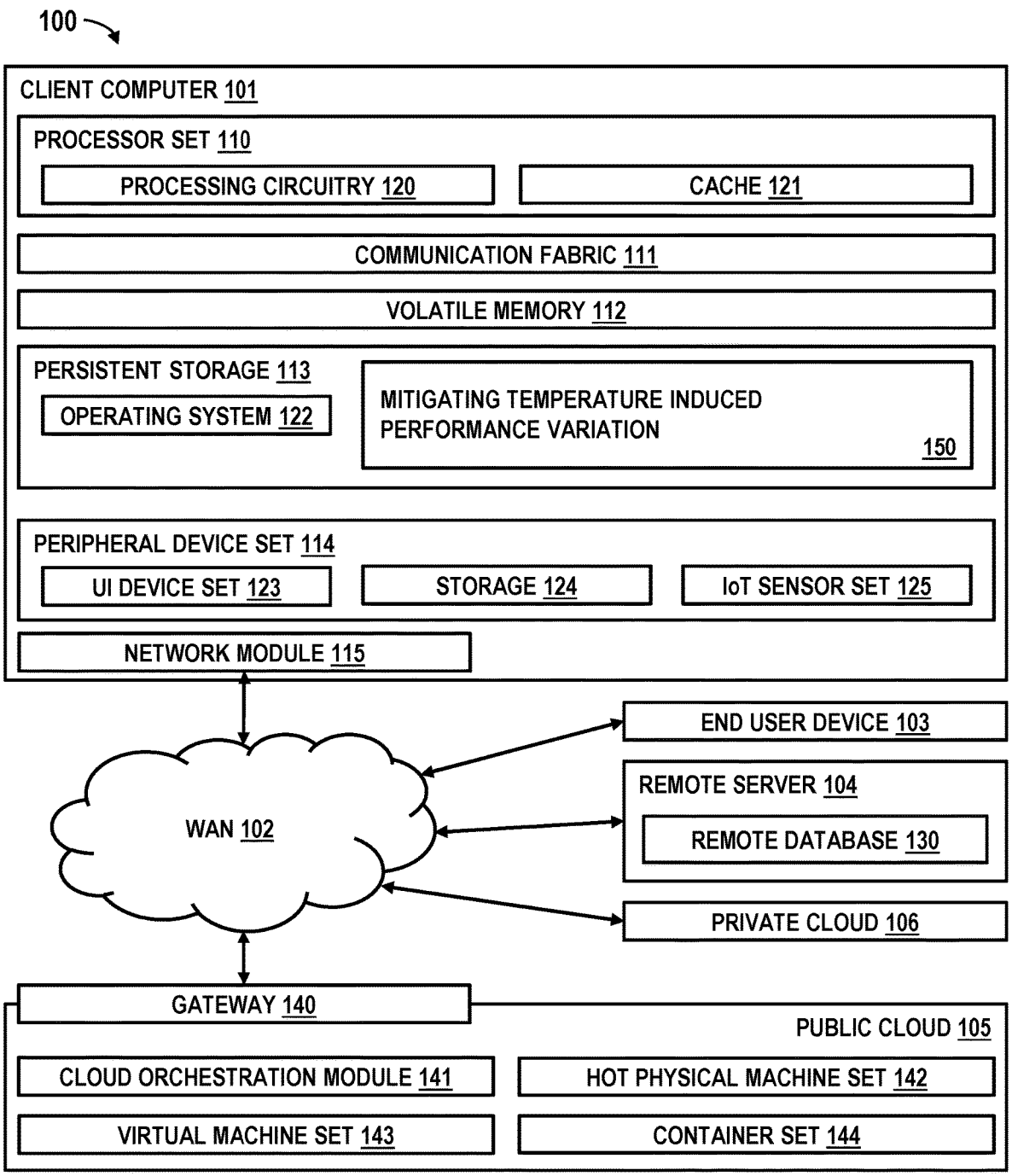
FIG. 1 depicts a block diagram of an example computer system for use in conjunction with one or more embodiments of the present disclosure.

Existing methods for distributing microservices in a cloud computing environment focus on the resource availability of the computing nodes to perform distribution. These methods do not take into account thermally induced performance variation across the various compute nodes. As a result, the overall execution of the workload (i.e., the collection of microservices), can be degraded due to the performance variation across the compute nodes.

In exemplary embodiments, a method for mitigating temperature induced performance variation in a cloud computing system is provided. The method generally includes tracking the temperatures of processors on the compute nodes executing microservices of a workload and actively controlling a cooling system of the processors and actively redistributing microservices among the compute nodes based on the variations of the temperatures of the processors.

In one embodiment, the method for mitigating temperature induced performance variation in a cloud computing system includes distributing a plurality of microservices among a plurality of computing nodes in the cloud computing system and monitoring a temperature of a processor executing the microservice on each of the plurality of compute nodes. The method also includes calculating a distribution of the temperatures of the processors including a mean temperature and identifying a first group of computing nodes from the plurality of computing nodes having temperatures within a threshold deviation from the mean temperature. The method further includes controlling an operation of a cooling system of each of a first group of computing nodes and redistributing one or more of the microservices disposed on a remaining group of computing nodes that are not part of the first group of computing nodes.

Advantageously, redistributing microservices disposed on nodes having a temperature that deviates from the mean temperature by more than the threshold mitigates the performance variation caused by different temperatures of the processors on the microservices. In addition, actively controlling the cooling systems of the computing nodes having a temperature within a threshold deviation from the mean temperature both reduces the performance variation caused by different temperatures of the processors on the microservices and reduces the chances that microservices will need to be redistributed among the computing nodes.

Various aspects of the present disclosure are described by narrative text, flowcharts, block diagrams of computer systems, and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as mitigating temperature induced performance variation in a cloud computing system 150. In addition to block 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any methodtype now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

COMMUNICATION FABRIC 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in block 150 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collects and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

One or more embodiments described herein can utilize machine learning techniques to perform prediction and or classification tasks, for example. In one or more embodiments, machine learning functionality can be implemented using an artificial neural network (ANN) having the capability to be trained to perform a function. In machine learning and cognitive science, ANNs are a family of statistical learning models inspired by the biological neural networks of animals, and in particular the brain. ANNs can be used to estimate or approximate systems and functions that depend on a large number of inputs. Convolutional neural networks (CNN) are a class of deep, feed-forward ANNs that are particularly useful at tasks such as, but not limited to analyzing visual imagery and natural language processing (NLP). Recurrent neural networks (RNN) are another class of deep, feed-forward ANNs and are particularly useful at tasks such as, but not limited to, unsegmented connected handwriting recognition and speech recognition. Other types of neural networks are also known and can be used in accordance with one or more embodiments described herein.

ANNs can be embodied as so-called "neuromorphic" systems of interconnected processor elements that act as simulated "neurons" and exchange "messages" between each other in the form of electronic signals. Similar to the so-called "plasticity" of synaptic neurotransmitter connections that carry messages between biological neurons, the connections in ANNs that carry electronic messages between simulated neurons are provided with numeric weights that correspond to the strength or weakness of a given connection. The weights can be adjusted and tuned based on experience, making ANNs adaptive to inputs and capable of learning. For example, an ANN for handwriting recognition is defined by a set of input neurons that can be activated by the pixels of an input image. After being weighted and transformed by a function determined by the network's designer, the activation of these input neurons are then passed to other downstream neurons, which are often referred to as "hidden" neurons. This process is repeated until an output neuron is activated. The activated output neuron determines which character was input. It should be appreciated that these same techniques can be applied in the case of containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Figure 2:
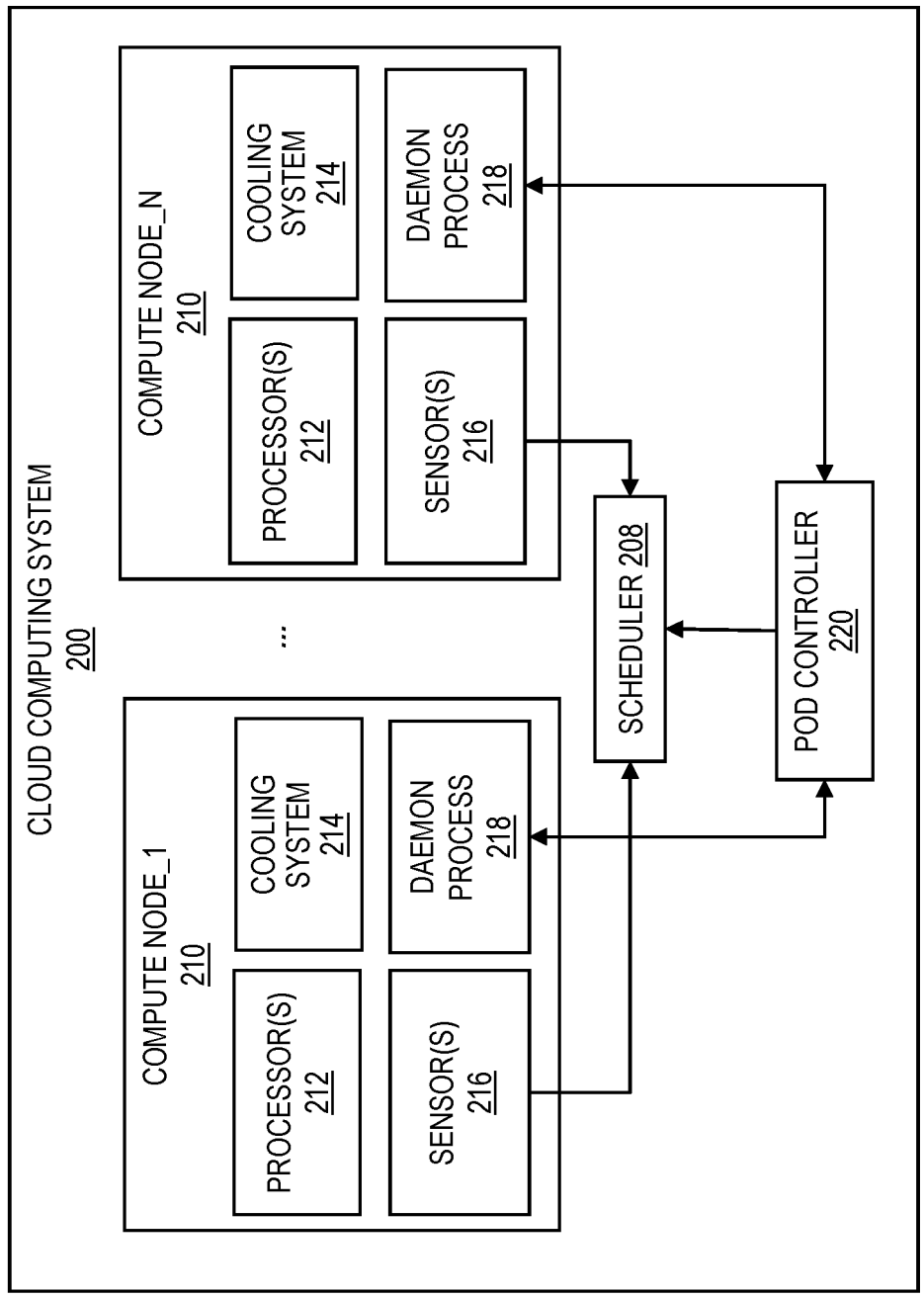
FIG. 2 depicts a block diagram of a system for mitigating temperature induced performance variation in a cloud computing system in accordance with one or more embodiments of the present disclosure.

Referring now to FIG. 2, a cloud computing system 200 for mitigating temperature induced performance variation in accordance with one or more embodiments of the present disclosure is shown. As illustrated, the cloud computing system 200 includes a plurality of compute nodes 210 that each includes one or more processors 212, a cooling system 214, sensors 216, and a daemon process 218. In one embodiment, the one or more processors 212 may include at least one general purpose processing unit (CPU) and at least one graphics processing unit (GPU).

In one embodiment, the cooling system 214 may be configured to cool one or more of the processors 212 individually or simultaneously. In one embodiment, the compute node 210 includes multiple cooling systems 214 that are each configured to cool one or more different processors. The cooling system 214 may include a heat sink, a fan, a liquid cooling device, or any other suitable cooling device.

In one embodiment, the sensor 216 is configured to periodically collect the temperature of each processor 212 and to transmit the temperature data to one or more of a scheduler 208 and a pod controller 220. In exemplary embodiments, the frequency of collection of the temperature data for each processor 212 is set by an administrator of the cloud computing system 200. Although illustrated as discrete items, the scheduler 208 and the pod controller 220 may be embodied in a single computing system, such as the one shown in FIG. 1. Alternatively, the scheduler 208 and the pod controller 220 may be embodied in separate computing systems, such as the one shown in FIG. 1.

In exemplary embodiments, the scheduler 208 is configured to distribute microservices among the compute nodes 210. The scheduler 208 controls the distribution of microservices to computing nodes 210 based at least in part on the temperature of the processor 212 of the compute nodes 210. In one embodiment, the scheduler 208 is configured to perform the method 500 shown in FIG. 5 to assign microservices to computing nodes 210.

Once the microservices have been distributed among the compute nodes 210 the pod controller 220 monitors the temperature of the processors 212 of the compute nodes 210 that are executing the microservices. In one embodiment, based on the temperature of the processors 212 of the various compute nodes 210, the pod controller 220 instructs the daemon process 218 on the compute nodes 210 to adjust the cooling system 214 for the processors 212. In addition, the pod controller 220 may instruct the scheduler 208 to move a microservice from one compute node 210 to another or from one processor 212 on a compute node 210 to another processor 212 on the same compute node 210.

Figure 3:
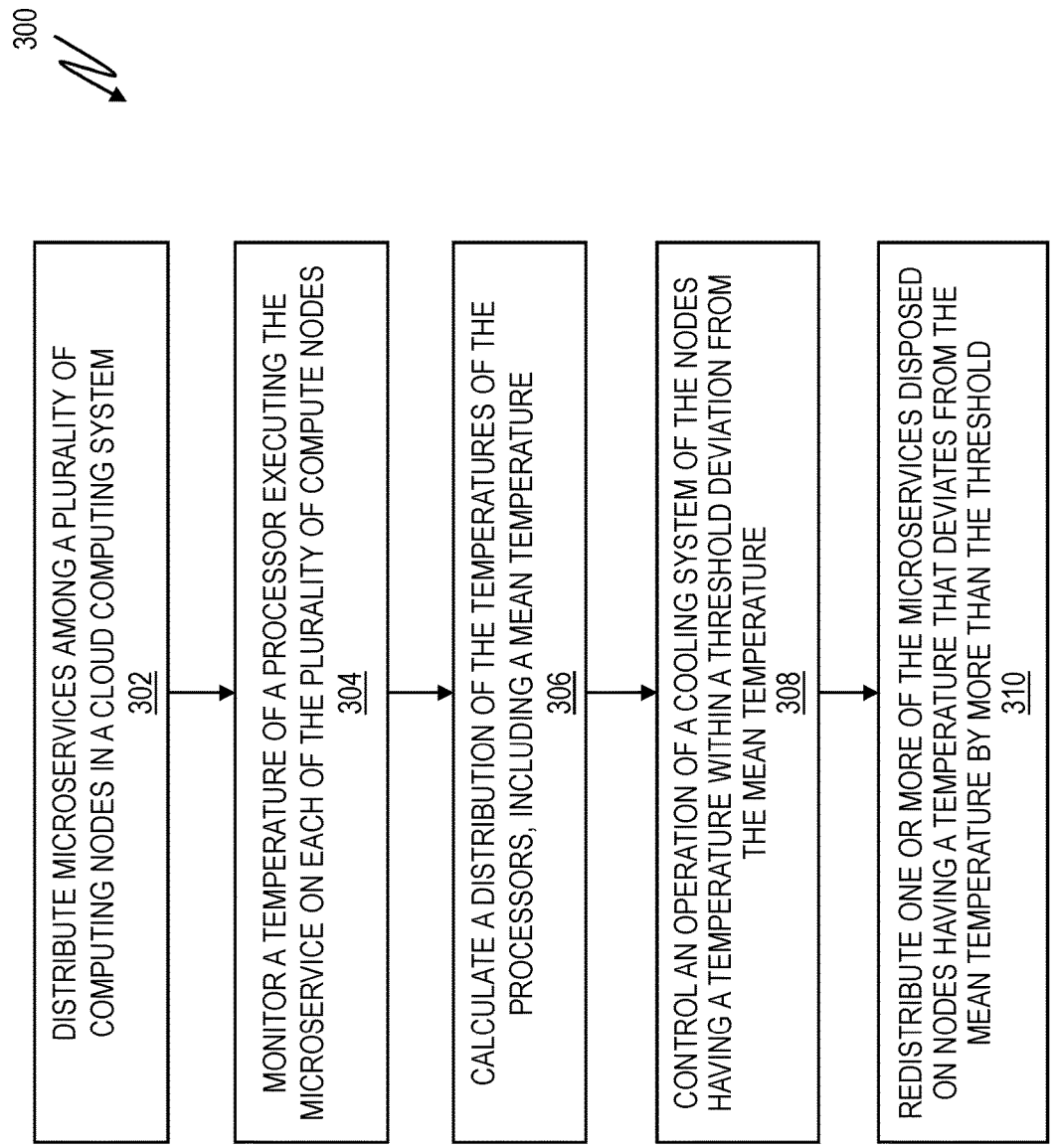
FIG. 3 is a flowchart of a method for mitigating temperature induced performance variation in a cloud computing system in accordance with one or more embodiments of the present disclosure.

Referring now to FIG. 3, a flowchart of a method 300 for mitigating temperature induced performance variation in a cloud computing system in accordance with one or more embodiments of the present disclosure is shown. As used herein the term cloud computing system refers to any cloud computing system and may include a public cloud, a private could, and a combination of the two. As shown at block 302, the method 300 includes distributing a plurality of microservices among a plurality of computing nodes in the cloud computing system. Next, as shown at block 304, the method 300 includes monitoring a temperature of a processor executing the microservice on each of the plurality of compute nodes. In exemplary embodiments, a service executing on each of the computing nodes monitors the temperature of the processor executing the microservice and periodically transmits the temperature data to microservices scheduler. The frequency in which the service samples and transmits the temperature of processor executing the microservice may be set by an administrator of the cloud computing system.

At block 306, the method 300 includes calculating a distribution of the temperatures of the processors including a mean temperature. In one embodiment, calculating the distribution includes identifying a type of the distribution and a threshold deviation from the mean temperature is determined based at least in part on a type of the distribution. The type of distribution is one of a normal distribution, a binomial distribution, and a chi-square distribution. For example, based on a determination that the distribution of the temperatures of the processors is a normal distribution, the threshold deviation may be set to one standard deviation above and below the mean temperature. Based on the distribution, a first group of computing nodes from the plurality of computing nodes having temperatures within a threshold deviation from the mean temperature is identified. In the above example, the first group of nodes are the nodes that have a temperature that is less than one standard deviation above or below the mean temperature.

At block 308, the method 300 includes controlling an operation of a cooling system of each of a first group of computing nodes, i.e., the nodes having a temperature within a threshold deviation from the mean temperature. In one embodiment, controlling the operation of the cooling system of the first group of computing nodes includes increasing a cooling rate of the cooling system associated with processors having temperatures below the mean temperature. In addition, controlling the operation of the cooling system of the first group of computing nodes can also include decreasing a cooling rate of the cooling system associated with processors having temperatures above the mean temperature. As a result, the temperatures of the processors in the first group of computing nodes are adjusted to bring the temperatures closer to the mean temperature.

At block 310, the method 300 includes redistributing one or more of the microservices disposed on a remaining group of computing nodes, i.e., nodes having a temperature that deviates from the mean temperature by more than the threshold. In one embodiment, redistributing the one or more of the microservices disposed on the remaining group of computing nodes that are not part of the first group of computing nodes includes identifying a first processor of a first computing node of the plurality of computing nodes having the highest temperature and identifying a second processor of a second computing node of the plurality of computing nodes having the lowest temperature. The redistributing also includes moving one or more microservices disposed on the first computing node to the second computing node.

In exemplary embodiments, redistributing microservices disposed on nodes having a temperature that deviates from the mean temperature by more than the threshold mitigates the performance variation caused by different temperatures of the processors on the microservices. In addition, actively controlling the cooling systems of the computing nodes having a temperature within a threshold deviation from the mean temperature both reduces the performance variation caused by different temperatures of the processors on the microservices and reduces the chances that microservices will need to be redistributed among the computing nodes.

Figure 4:
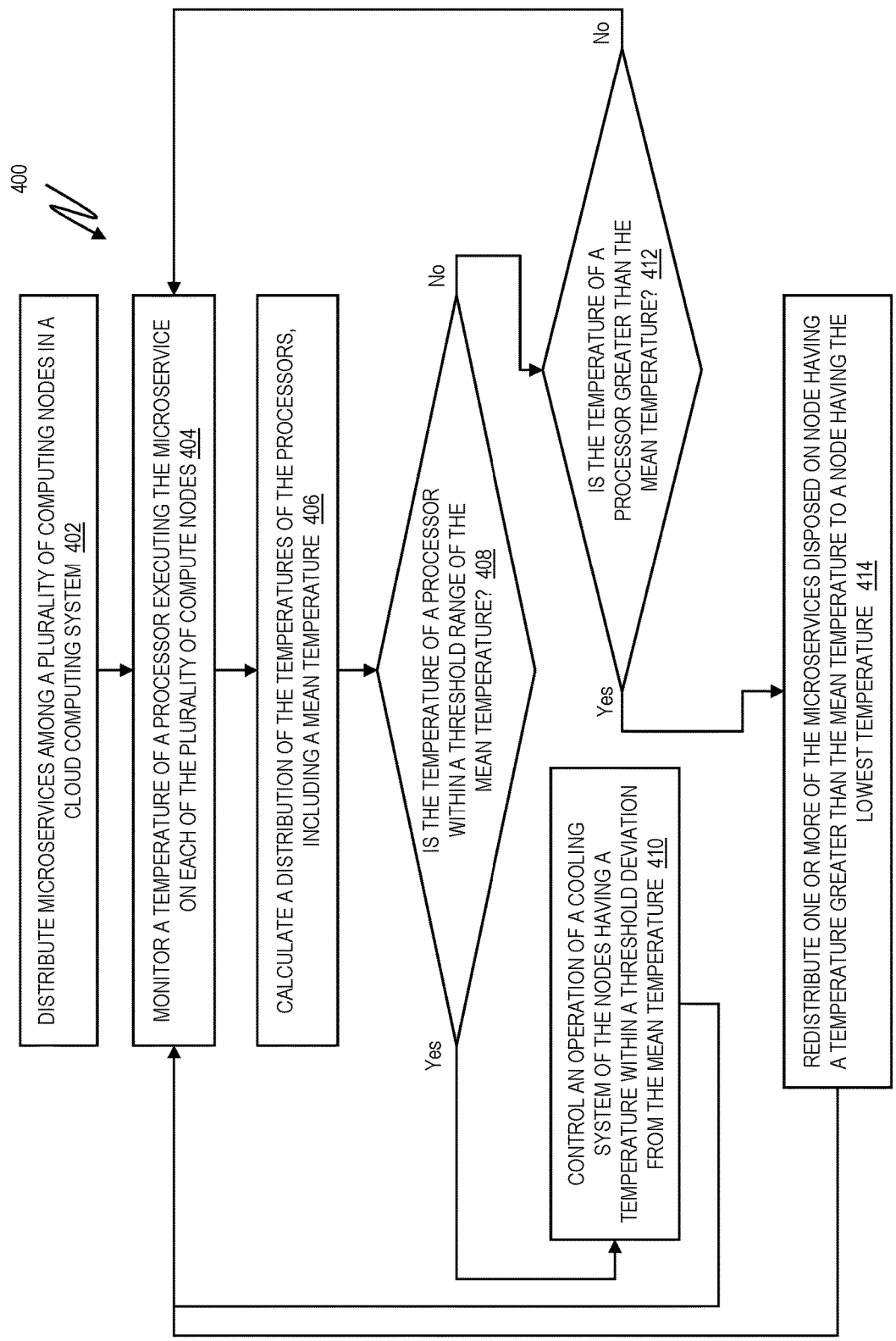
FIG. 4 is a flowchart of a method for mitigating temperature induced performance variation in a cloud computing system in accordance with one or more embodiments of the present disclosure and FIG. 5 is a flowchart of a method for mitigating temperature induced performance variation in a cloud computing system in accordance with one or more embodiments of the present disclosure.

Referring now to FIG. 4, a flowchart of a method 400 for mitigating temperature induced performance variation in a cloud computing system in accordance with one or more embodiments of the present disclosure is shown. As shown at block 402, the method 400 includes distributing a plurality of microservices among a plurality of computing nodes in the cloud computing system. Next, as shown at block 404, the method 400 includes monitoring a temperature of a processor executing the microservice on each of the plurality of compute nodes. In exemplary embodiments, a service executing on each of the computing nodes monitors the temperature of the processor executing the microservice and periodically transmits the temperature data to the microservices scheduler. The frequency in which the service samples and transmits the temperature of the processor executing the microservice may be set by an administrator of the cloud computing system.

At block 406, the method 400 includes calculating a distribution of the temperatures of the processors including a mean temperature. In one embodiment, calculating the distribution includes identifying a type of the distribution, and a threshold deviation from the mean temperature is determined based at least in part on a type of distribution. The type of distribution is one of a normal distribution, a binomial distribution, and a chi-square distribution. For example, based on a determination that the distribution of the temperatures of the processors is a normal distribution, the threshold deviation may be set to one standard deviation above and below the mean temperature. Based on the distribution, a first group of computing nodes from the plurality of computing nodes having temperatures within a threshold deviation from the mean temperature is identified. In the above example, the first group of nodes are the nodes that have a temperature that is less than one standard deviation above or below the mean temperature.

At decision block 408, the method 400 includes determining whether the temperature of a processor is within a threshold range of the mean temperature. Based on a determination that the temperature of a processor is within a threshold range of the mean temperature, the method 400 proceeds to block 410 and includes controls the operation of a cooling system of the nodes having a temperature within a threshold deviation from the mean temperature In one embodiment, controlling the operation of the cooling system of the computing nodes includes increasing a cooling rate of the cooling system associated with processors having temperatures below the mean temperature. In addition, controlling the operation of the cooling system of the computing nodes can also include decreasing the cooling rate of the cooling system associated with processors having temperatures above the mean temperature. As a result, the temperatures of the processors of computing nodes are adjusted to bring the temperatures closer to the mean temperature.

At decision block 412, the method 400 includes determining whether the temperature of a processor is greater than the mean temperature. Based on a determination that the temperature of a processor is greater than the mean temperature, the method 400 proceeds to block 414 and redistributes one or more of the microservices disposed on node having a temperature greater than the mean temperature to a node having the lowest temperature.

In exemplary embodiments, redistributing microservices disposed on nodes having a temperature that deviates from the mean temperature by more than the threshold mitigates the performance variation caused by different temperatures of the processors on the microservices. In addition, actively controlling the cooling systems of the computing nodes having a temperature within a threshold deviation from the mean temperature both reduces the performance variation caused by different temperatures of the processors on the microservices and reduces the chances that microservices will need to be redistributed among the computing nodes.

Figure 5:
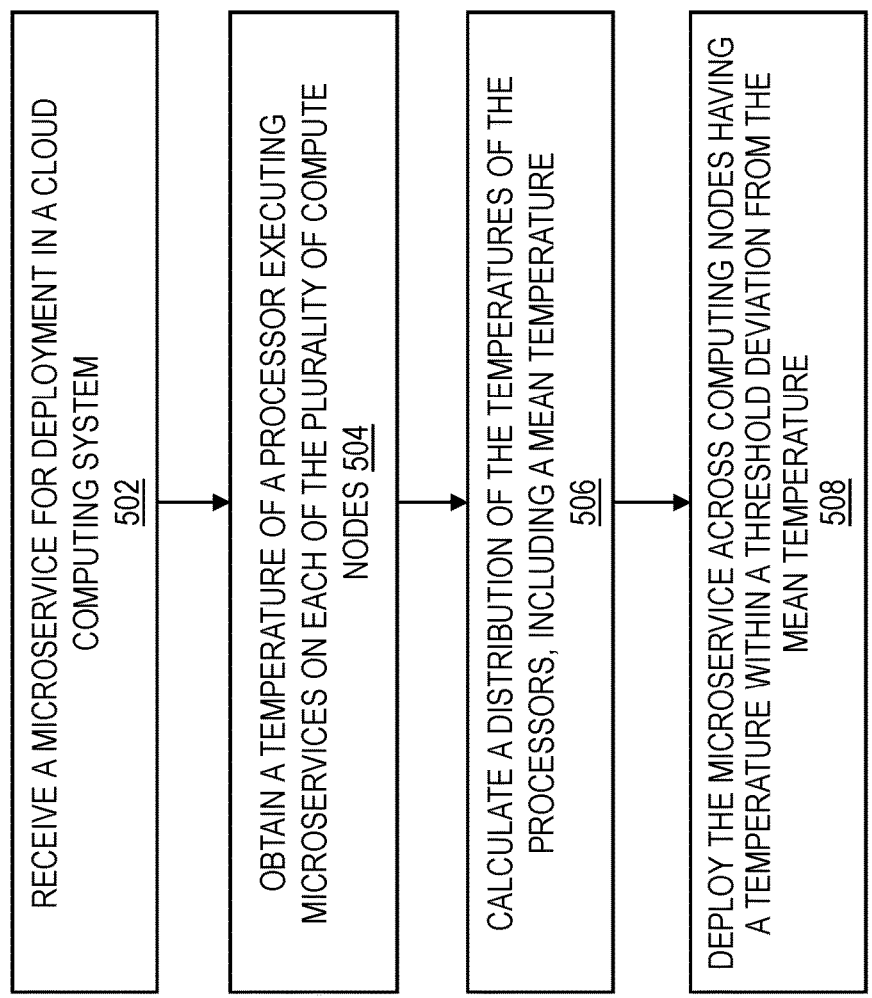

Referring now to FIG. 5, a flowchart of a method 500 for mitigating temperature induced performance variation in a cloud computing system in accordance with one or more embodiments of the present disclosure is shown. As shown at block 502, the method 500 includes receiving a microservice for deployment in a cloud computing system. Next, as shown at block 504, the method 500 includes obtaining a temperature of a processor executing microservices on each of the plurality of compute nodes. In exemplary embodiments, a service executing on each of the computing nodes monitors the temperature of the processor executing the microservice and periodically transmits the temperature data to microservices scheduler. The frequency in which the service samples and transmits the temperature of the processor executing the microservice may be set by an administrator of the cloud computing system.

At block 506, the method 500 includes calculating a distribution of the temperatures of the processors, including a mean temperature. In one embodiment, calculating the distribution includes identifying a type of the distribution, and a threshold deviation from the mean temperature is determined based at least in part on a type of the distribution. The type of distribution is one of a normal distribution, a binomial distribution, and a chi-square distribution. For example, based on a determination that the distribution of the temperatures of the processors is a normal distribution, the threshold deviation may be set to one standard deviation above and below the mean temperature. Based on the distribution, a first group of computing nodes from the plurality of computing nodes having temperatures within a threshold deviation from the mean temperature is identified. In the above example, the first group of nodes are the nodes that have a temperature that is less than one standard deviation above or below the mean temperature.

At block 508, the method 500 includes deploying the microservice across computing nodes having a temperature within a threshold deviation from the mean temperature. In exemplary embodiments, deploying microservices microservice across computing nodes having a temperature within a threshold deviation from the mean temperature mitigates the performance variation that is caused by different temperatures of the processors on the microservices.

Various embodiments are described herein with reference to the related drawings. Alternative embodiments can be devised without departing from the scope of the present disclosure. Various connections and positional relationships (e.g., over, below, adjacent, etc.) are set forth between elements in the following description and in the drawings. These connections and/or positional relationships, unless specified otherwise, can be direct or indirect, and the present disclosure is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the present disclosure may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A method for mitigating temperature induced performance variation in a cloud computing system, the method comprising:
    distributing a plurality of microservices among a plurality of compute nodes in the cloud computing system;
    monitoring a temperature of processors executing each of the plurality of microservices on each of the plurality of compute nodes;
    calculating a distribution of the temperatures of the processors including a mean temperature;
    identifying a first group of computing nodes from the plurality of compute nodes having temperatures within a threshold deviation from the mean temperature;
    controlling an operation of a cooling system of each of the first group of computing nodes; and
    redistributing one or more of the plurality of microservices disposed on a remaining group of computing nodes that are not part of the first group of computing nodes.

2. The method of claim 1, wherein controlling the operation of the cooling system of the first group of computing nodes includes increasing a cooling rate of the cooling system associated with processors having temperatures below the mean temperature.

3. The method of claim 1, wherein controlling the operation of the cooling system of the first group of computing nodes includes decreasing a cooling rate of the cooling system associated with processors having temperatures above the mean temperature.

4. The method of claim 1, wherein calculating the distribution includes identifying a type of the distribution and wherein the threshold deviation is determined based at least in part on the type of the distribution.

5. The method of claim 4, wherein the type of the distribution is one of a normal distribution, a binomial distribution, and a chi-square distribution.

6. The method of claim 1, wherein redistributing one or more of the plurality of microservices disposed on the remaining group of computing nodes that are not part of the first group of computing nodes comprises:
    identifying a first processor of a first computing node of the plurality of compute nodes having a highest temperature; and
    identifying a second processor of a second computing node of the plurality of compute nodes having a lowest temperature.

7. The method of claim 6, wherein the redistributing comprises moving one or more microservices disposed on the first computing node to the second computing node.

8. A computing system having a memory having computer readable instructions and one or more processors for executing the computer readable instructions, the computer readable instructions controlling the one or more processors to perform operations comprising:
    distributing a plurality of microservices among a plurality of compute nodes in a cloud computing system;
    monitoring a temperature of processors executing each of the plurality of microservices on each of the plurality of compute nodes;
    calculating a distribution of the temperatures of the processors including a mean temperature;
    identifying a first group of computing nodes from the plurality of compute nodes having temperatures within a threshold deviation from the mean temperature;
    controlling an operation of a cooling system of each of the first group of computing nodes; and
    redistributing one or more of the plurality of microservices disposed on a remaining group of computing nodes that are not part of the first group of computing nodes.

9. The computing system of claim 8, wherein controlling the operation of the cooling system of the first group of computing nodes includes increasing a cooling rate of the cooling system associated with processors having temperatures below the mean temperature.

10. The computing system of claim 8, wherein controlling the operation of the cooling system of the first group of computing nodes includes decreasing a cooling rate of the cooling system associated with processors having temperatures above the mean temperature.

11. The computing system of claim 8, wherein calculating the distribution includes identifying a type of the distribution and wherein the threshold deviation is determined based at least in part on the type of the distribution.

12. The computing system of claim 11, wherein the type of the distribution is one of a normal distribution, a binomial distribution, and a chi-square distribution.

13. The computing system of claim 8, wherein redistributing one or more of the plurality of microservices disposed on the remaining group of computing nodes that are not part of the first group of computing nodes comprises:
identifying a first processor of a first computing node of the plurality of compute nodes having a highest temperature; and
identifying a second processor of a second computing node of the plurality of compute nodes having a lowest temperature.

14. The computing system of claim 13, wherein the redistributing comprises moving one or more microservices disposed on the first computing node to the second computing node.

15. A computer program product comprising a computer readable storage medium having program instructions embodied therewith, the program instructions executable by a processor to cause the processor to perform operations comprising:
distributing a plurality of microservices among a plurality of compute nodes in a cloud computing system;
monitoring a temperature of processors executing each of the plurality of microservices on each of the plurality of compute nodes;
calculating a distribution of the temperatures of the processors including a mean temperature;
identifying a first group of computing nodes from the plurality of compute nodes having temperatures within a threshold deviation from the mean temperature;
controlling an operation of a cooling system of each of the first group of computing nodes; and
redistributing one or more of the plurality of microservices disposed on a remaining group of computing nodes that are not part of the first group of computing nodes.

16. The computer program product of claim 15, wherein controlling the operation of the cooling system of the first group of computing nodes includes increasing a cooling rate of the cooling system associated with processors having temperatures below the mean temperature.

17. The computer program product of claim 15, wherein controlling the operation of the cooling system of the first group of computing nodes includes decreasing a cooling rate of the cooling system associated with processors having temperatures above the mean temperature.

18. The computer program product of claim 15, wherein calculating the distribution includes identifying a type of the distribution and wherein the threshold deviation is determined based at least in part on the type of the distribution.

19. The computer program product of claim 18, wherein the type of the distribution is one of a normal distribution, a binomial distribution, and a chi-square distribution.

20. The computer program product of claim 15, wherein redistributing one or more of the plurality of microservices disposed on the remaining group of computing nodes that are not part of the first group of computing nodes comprises:
identifying a first processor of a first computing node of the plurality of compute nodes having a highest temperature; and
identifying a second processor of a second computing node of the plurality of compute nodes having a lowest temperature.

* * * * *